3,280,180
PENTAFLUOROPHENYL CARBOXYLIC ACIDS
Michael William Buxton, Avonmouth, and John Colin Tatlow, Edgbaston, Birmingham, England, assignors to The National Smelting Company Limited, London, England
No Drawing. Filed Feb. 13, 1964, Ser. No. 344,548
Claims priority, application Great Britain, Mar. 21, 1960, 9,947/60
3 Claims. (Cl. 260—515)

This application is a continuation-in-part of our earlier application Serial No. 95,818, filed March 15, 1961, which is now abandoned.

This invention relates to carboxylic acids, and more especially to fluorinated carboxylic acids and their derivatives.

Although several methods are known for the preparation of 2,3,4,5,6-pentafluorobenzoic acid (see e.g. Gething et al., Nature, 183, 588 (1959); Nield et al., J. Chem. Soc. 166 (1959)), the higher acids in which the —COOH group is one or more carbon atoms remote from the $C_6F_5$— ring have not hitherto been prepared.

We have now, however, accomplished the preparation of some of these acids and of certain of their derivatives.

It is a primary object of the invention to provide new pentafluorophenyl-substituted compounds having functional groups in some proximity to the $C_6F_5$— ring and thereby to provide useful compounds by means of which the $C_6F_5$— group can be readily used in chemical synthesis.

The invention provides new chemical compounds containing a pentafluorophenyl nucleus and a —COOH group separated from that nucleus by at least one carbon atom and less than 4 carbon atoms.

Especially valuable examples of the above are those based on the acids with 1 or 2 carbon atoms between the ring structure and the —COOH group, such as 2,3,4,5,6-pentafluorophenylacetic acid, β-2,3,4,5,6-pentafluorophenylpropionic acid, β-2,3,4,5,6-pentafluorophenylacrylic acid and 2,3,4,5,6-pentafluoromandelic acid.

The invention also relates to methods of preparing the new chemical compounds described in the two preceding paragraphs.

To make 2,3,4,5,6-pentafluorophenylacetic acid, 2,3,4,5,6-pentafluorobenzyl halide, $C_6F_5CH_2X$, where X is Cl or Br, may be converted to 2,3,4,5,6-pentafluorobenzyl cyanide and the cyanide hydrolyzed.

The 2,3,4,5,6-pentafluorobenzyl halide may be formed by reacting 2,3,4,5,6-pentafluorotoluene with a halogenating agent, or from 2,3,4,5,6-pentafluorobenzyl alcohol, which is reacted with $PCl_5$ or $HBr/H_2SO_4$.

The 2,3,4,5,6-pentafluorotoluene may be prepared by methylation of hexafluorobenzene, or by reacting the pentafluorophenyl magnesium halide with dimethyl sulphate.

To prepare β-2,3,4,5,6-pentafluorophenylacrylic acid a mixture of pentafluorobenzaldehyde, potassium acetate and acetic anhydride may be heated at between 80° to 150° C. for 1 to 5 hours, and the cooled mixture poured into dilute hydrochloric acid.

Preferably the mixture is heated for 3 hours at 125° C.

Alternatively, to prepare β-2,3,4,5,6-pentafluorophenylacrylic acid a mixture of pentafluorobenzaldehyde, malonic acid, pyridine and small amounts of piperidine may be heated and the resulting mixture poured into dilute acid to precipitate 2,3,4,5,6-pentafluorophenylacrylic acid.

Reaction in this case is best carried out at 80° C. for 1 hour followed by heating at 110° C. for 2½ hours.

β-2,3,4,5,6-pentafluorophenylpropionic acid may be prepared by hydrogenation of 2,3,4,5,6-pentafluorophenylacrylic acid in alcohol solution with a nickel catalyst.

The invention further provides a method for the preparation of 2,3,4,5,6-pentafluoromandelic acid, by reacting pentafluorobenzaldehyde with sodium or potassium bisulphite, adding aqueous potassium cyanide solution to the complex formed to produce the cyanhydrin, and converting this cyanhydrin to the 2,3,4,5,6-pentafluoromandelic acid by hydrolysis. Conveniently the acid used for hydrolysis is concentrated hydrochloric acid.

The acids of the invention may be used to provide synthetic intermediates in the preparation of new penicillins of hitherto unknown type as well as for intermediates for use in producing the derivatives mentioned above. Another use is to prepare derivatives such as substituted ureas and amides with the carboxyl group modified as follows:

—$CONHCONH_2$ or

—$CONHCH_2CH_2N(C_2H_5)_2$ or basic esters such as

$C_6F_5CH_2CH_2COOCH_2CH_2N(R)_2$ where R is $CH_3$ or $C_2H_5$.

Compounds of this type have physiological activity, for example, 2,3,4,5,6-pentafluorophenylacetylurea

$C_6F_5CH_2CONHCONH_2$ has proved useful as an anticonvulsant.

The invention will be further described with reference to the following examples.

*Example 1*

Hexafluorobenzene is reacted with one molar equivalent of methyl lithium in ethereal solution to give 2,3,4,5,6-pentafluorotoluene $C_6F_5CH_3$ of boiling point 117° C. The methyl group is then halogenated e.g. by reacting with one molecular equivalent of sulphuryl chloride in the presence of 0.005 molecular equivalent of dibenzoyl peroxide. The major product is 2,3,4,5,6-pentafluorobenzyl chloride $C_6F_5CH_2Cl$ boiling point 88–90° C. at a pressure of 69 mm. of mercury, a colourless lachrymatory liquid. Smaller quantities of products containing more chlorine are formed. The chlorine atom in 2,3,4,5,6-pentafluorobenzyl chloride is replaced by a nitrile group by reaction with methanolic potassium cyanide. 2,3,4,5,6-pentafluorobenzyl cyanide is a colourless liquid boiling point 128–134° C. at a pressure of 64 mm. of mercury. The 2,3,4,5,6-pentafluorobenzyl cyanide is converted to 2,3,4,5,6-pentafluorophenyl acetic acid by hydrolysis with a mixture of equal parts of water, 98% sulphuric acid and glacial acetic acid.

The 2,3,4,5,6-pentafluorotoluene can be alternatively chlorinated by reacting it when boiling with chlorine. 2,3,4,5,6-pentafluorophenyl acetic acid is a colourless solid of melting point 108° C. It is only sparingly soluble in cold water, but will react with aqueous solutions of alkali carbonates forming the alkali metal salts. The acid may be purified by recrystallisation from petroleum ether.

*Example 2*

An ethereal solution of methyl lithium (70 cc., containing 2.1 g. of methyl lithium) was added to a stirred solution of hexafluorobenzene (20 g.) in dry ether (20 cc.) at a rate sufficient to maintain a gentle reflux. Stirring was maintained for ½ hour after the addition was complete and water (100 cc.) added. The ether layer was dried ($MgSO_4$), filtered and most of the ether distilled through a 6″ column and the residual liquid (17 g.) separated by gas chromatography (column 488 cm. x 75 mm., packing silicone gum/kieselguhr 1:3, temp. 100°, $N_2$ flow-rate 45 l./hr.) to give ether, hexafluorobenzene (1.2 g.), 2,3,4,5,6-pentafluorotoluene (13.8 g.) (both displaying correct infrared spectra).

*Example 3*

2,3,4,5,6-pentafluorotoluene (9.0 g.) mixed with bromine (8.1 g.) was irradiated with ultra-violet light for 12 hours at 15°, after which time most of the bromine had reacted. The lachrymatory liquid residue was distilled from phosphorus pentoxide to give 2,3,4,5,6-pentafluorobenzyl bromide (12.0 g.) B.P. 174–175°; the infrared spectrum was identical with that of the product from the reaction of 2,3,4,5,6-pentafluorobenzyl alcohol and hydrogen bromide and had bands at 3000 cm.$^{-1}$ (methylene) and 1510 cm.$^{-1}$ (aromatic ring).

*Example 4*

(a) A stream of chlorine was passed into boiling 2,3,4,5,6-pentafluorotoluene (50.6 g.) for 12 hours in a silica reaction vessel irradiated with ultra-violet light. Fractional distillation of the product (57.8 g.) gave 2,3,4,5,6-pentafluorobenzyl chloride (29.3 g.) B.P. 80° 47 mm., $n_D^{20}$ 1.4435 (Found: C, 38.7; H, 1.1. $C_7H_2ClF_5$ requires C, 38.8; H, 0.9%) together with higher boiling material (24.8 g.).

*Example 5*

A mixture of 2,3,4,5,6-pentafluorobenzyl chloride (11.9 g.), potassium cyanide (4.5 g.), water (15 cc.) and ethanol (35 cc.) was stirred at 75° for 60 min. and then poured into water (250 cc.). The organic layer and ether extracts of the aqueous phase were combined, washed with water, dried ($CaCl_2$), filtered and distilled to give 2,3,4,5,6-pentafluorobenzyl cyanide (9.0 g.), B.P. 107–11°/17 mm. (Found: C, 46.0; H, 0.9. $C_8H_2F_5N$ requires C, 46.4; H, 1.0%) which had infrared bands at 2930 and 2900 cm.$^{-1}$ (methylene), 2240 cm.$^{-1}$ (cyanide) and 1515 cm.$^{-1}$ (aromatic ring). The same product (yield 52%) was obtained in a similar reaction with pentafluorobenzyl bromide.

*Example 6*

2,3,4,5,6-pentafluorobenzyl cyanide (22.0 g.), concentrated sulphuric acid (22 cc.), glacial acetic acid (22 cc.) and water (22 cc.) were refluxed for 45 min., then poured into water. The precipitate was filtered off, and taken up in sodium carbonate solution which was filtered. Acidification of the filtrate gave 2,3,4,5,6-pentafluorophenylacetic acid (21.0 g.; from light petroleum B.P. 80–100°), M.P. 109° (Found: C, 42.8; H, 1.4. $C_8H_3F_5O_2$ requires C, 42.5; H, 1.3%). There were infrared bands at 3200–2500 and 1720 cm.$^{-1}$ (carboxyl) and 1520 and 1530 cm.$^{-1}$ (aromatic ring).

2,3,4,5,6-pentafluorophenylacetic acid (0.6 g.) with p-bromophenacyl bromide gave-p-bromophenacyl-2,3,4,5,6-pentafluorophenyl acetate (0.7 g.; from aqueous ethanol), M.P. 104.5°. (Found: C, 45.5; H, 2.0. $C_{16}H_8BrF_5O_3$ requires C, 45.4; H, 1.9%.)

*Example 7*

β-2,3,4,5,6-pentafluorophenylacrylic acid was prepared from pentafluorobenzaldehyde thus, a mixture of pentafluorobenzaldehyde (5 parts), freshly fused potassium acetate (1.5 parts) and freshly distilled acetic anhydride (4.2 parts) was heated under reflux at 125° for 3 hours. The cooled mixture was poured into dilute hydrochloric acid causing β-2,3,4,5,6-pentafluorophenylacrylic acid (35% yield) M.P. 152.5° to be precipitated. Found: C, 45.3; H, 1.2; F, 39.0%. Calc. for $C_9H_3C_2F_5$: C, 45.4; H, 1.3; F, 39.9%.

*Example 8*

β-2,3,4,5,6-pentafluorophenylacrylic acid was prepared thus: pentafluorobenzaldehyde (5.7 parts), malonic acid (6.0 parts), pyridine (10 parts) and piperidine (0.5 part) were mixed and heated at 80° C. for 1 hour, then at 110° for 2½ hours. On cooling the mixture was poured into water, extracted with ether, dried and the residual gum acidified in concentrated sulphuric acid (10 ml.) at 100° C. for 10 minutes. The precipitated β-2,3,4,5,6-pentafluorophenylacrylic acid weighed 2.3 parts.

The acid gave a p-bromophenylphenacyl ester, M.P. 125–6° in the usual way.

Found: C, 46.7; H, 1.9%. Calc. for $C_{17}H_8O_3BrF_5$: C, 46.9; H, 1.85%.

β-2,3,4,5,6-pentafluorophenylacrylic acid will be important as an intermediate in organic synthetic work.

*Example 9*

β-2,3,4,5,6-pentafluorophenylpropionic acid was prepared from β-2,3,4,5,6-pentafluorophenylacrylic acid by hydrogenation of an alcoholic solution of this acid with hydrogen at atmospheric, or slightly greater than atmospheric pressure, in the presence of Raney nickel catalyst. The yield in this reaction was 93%. The acid may be recrystallised from a large volume of hot water or from petroleum ether (B.R. 60–80°). The pure compound has a M.P. 95–6°. (Found: C, 45.0; H, 2.3; F, 39.1; $C_9H_5F_5O_2$ requires C, 45.0; H, 2.1; F, 39.6%.)

*Example 10*

A cooled solution of potassium cyanide (1.0 g.) in water (5 cc.) was added slowly with stirring to pentafluorobenzaldehyde sodium bisulphite compound (3.4 g.) in water (25 cc.). After stirring for 8 hours at 15° a yellow precipitate separated and this was extracted with ether in two amounts of 25 cc. each. The extract was dried with $MgSO_4$ and was evaporated to leave a sticky, colourless gum which was kept at 100° with concentrated hydrochloric acid (50 cc.) for 4 hours to hydrolyse it.

The resulting clear solution was diluted with water and continuously extracted with ether overnight. The ether layer was again dried with $MgSO_4$, decolourised with charcoal, filtered and evaporated to leave a white solid (1.2 g.) M.P. 141-2° which was recrystallised twice from benzene and sublimed to give DL-2,3,4,5,6-pentafluoromandelic acid (0.6 g.) M.P. 141–2°. (Found: C, 39.8; H, 1.1; $C_8H_3F_5O_3$ requires C, 39.7; H, 1.2%.)

To characterise the compound further, the acid (0.2 g.) and S-benzylthiuronium chloride gave, after two recrystallisations from water, S-benzylthiuronium-DL-pentafluoromandelate (0.1 g.), M.P. 168–169°. (Found: C, 46.9; H, 2.9; $C_{16}H_{13}F_5N_2O_3S$ requires C, 47.0; H, 3.2%.)

Various modifications may be made within the scope of the invention as defined by the appended claims.

Reference is made to Belgian Patent No. 603,596 in which examples of how to use the new acids are given.

These examples are also given here for convenience to illustrate the use of the new compounds to prepare acid derivatives of the properties and uses indicated.

*Example 11*

Ethyl pentafluorophenylacetate was synthesised by refluxing a mixture of pentafluorophenylacetic acid and an excess of ethanol in the presence of catalytic amounts of fluosulphonic acid. The ethyl ester was obtained in a yield of 84% and is a colourless liquid, B.P. 95–96°/14 mm. Found: C, 47.1; H, 2.8; F, 36.9%. $C_{10}H_7O_2F_5$ requires C, 47.3; H, 2.8; F, 37.4%.

*Example 12*

Pentafluorobenzoic acid (8.4 g.) and phosphorus pentachloride (9.3 g.) were mixed. After the vigorous reaction has subsided, the mixture was heated at 100° for 1 hour. Distillation gave pentafluorobenzoyl chloride (5.5 g.) B.P. 70°/23 mm.

*Example 13*

Pentafluorophenylacetic acid (5.7 g.) was mixed with phosphorus pentachloride (5.5 g.). The vigorous reaction was completed by heating the mixture at 100° for 30 minutes. Distillation afforded pentafluorophenyl acetyl chloride (5.1 g.) B.P. 90–95°/29 mm.

Example 14

Pentafluorobenzoyl chloride (5.5 g.) was dissolved in ether (100 cc.) and treated at 0° C. with an excess of ammonia gas. The mixture was shaken with water, the ethereal layer separated and evaporated to give pentafluorobenzamide (4.7 g.) M.P. 149/150°. Recrystallisation from benzene afforded the pure compound, M.P. 151°. Found: C, 40.0; H, 1.1; F, 45.2. $C_7H_2CNF_5$ requires: C, 39.8; H, 1.0; F, 45.0%.

Example 15

A solution of pentafluorobenzoyl chloride (11.1 g.) in ether (120 cc.) was treated with diethylamine (7.4 g.) in ether (10 cc.). The mixture was poured into water, the ether layer separated, dried ($MgSO_4$), filtered and distilled to give N,N-diethylpentafluorobenzamide (8.0 g.) B.P. 145°/20 mm. Found: C, 48.9; H, 3.3; F, 35.0. $C_{11}H_{10}ONF_5$ required: C, 49.4; H, 3.8; F, 35.6%.

Example 16

A solution of pentafluorophenylacetyl chloride (1.2 g.) in ether (60 cc.) was treated with an excess of ammonia gas at 0°. The solution was washed with water and the dried ($MgSO_4$) ether layer was evaporated to give a solid (1.0 g.) which on recrystallisation from alcohol/benzene gave pentafluorophenyl acetamide (0.7 g.) M.P. 187° undepressed in admixture with an authentic sample prepared by reaction of pentafluorophenylmethyl cyanide with concentrated sulphuric acid.

Example 17

Pentafluorophenylacetyl chloride (12.0 g.) dissolved in ether (150 cc.) was cooled to 0° C. and treated with diethylamine (7.8 g.) in ether (10 cc.). The mixture was washed with water, the ethereal layer dried ($MgSO_4$), filtered and distilled to give N,N-diethylpentafluorophenylacetamide (10.2 g.) B.P. 126–128°/2 mm. Found: C, 51.0; H, 4.4; F, 33.8. $C_{12}H_{12}ONF_5$ requires C, 51.25; H, 4.3; F, 33.8%.

Example 18

Ethyl β-(pentafluorophenyl) propionate was obtained by refluxing a mixture of β-(pentafluorophenyl) propionic acid and an excess of ethanol in the presence of catalytic amounts of fluosulphonic acid. The ester was obtained in a yield of 90%, and is a stable colourless liquid, B.P. 117–9°/15 mm. Found: C, 48.8; H, 3.2; F, 35.6. $C_{11}H_9O_2F_5$ requires C, 49.3; H, 3.4; F, 35.4%.

Example 19

β-(Pentafluorophenyl) propionic acid (13.1 g.) was mixed with phosphorous pentachloride (12.5 g.) and the vigorous reaction was completed by heating at 100° for ½ hour. Distillation gave β-(pentafluorophenyl) propionyl chloride (11.7 g.), B.P. 125°/32 mm. Found: C, 41.8; H, 1.55; F, 36.7; Cl, 13.7%.

Example 20

Treatment of an ethereal solution of β-(pentafluorophenyl) propionyl chloride (1.9 g.) with an excess of ammonia gas, followed by washing the mixture with water and evaporation of the ether gave β-(pentafluorophenyl) propionamide (1.7 g.), M.P. 145.5–135.0°. Found: C, 45.3; H, 2.7; F, 39.4; N, 5.85. $C_9H_6NOF_5$ requires C, 45.2; H, 2.5; F, 39.7; N, 5.9%.

Example 21

A solution of β-(pentafluorophenyl) propionyl chloride (9.6 g.) in ether (100 cc.) was treated with diethylamine (6.0 g.) at 0°. The mixture was washed with water, the ether layer dried ($MgSO_4$), filtered and distilled to give N,N-diethyl-β-(pentafluorophenyl) propionamide (10.6 g.), B.P. 126–7°/0.2 mm. Found: C, 52.6; H, 4.8; F, 32.1. $C_{12}H_{14}ONF_5$ requires C, 52.9; H, 4.8; F, 32.2%.

With regard to these Examples 11 to 21 the esters produced (e.g. Examples 11, 18) are heat-resistant fluids resistant to nuclear radiation and thus have utility as specialised heat exchange fluids in plants liable to nuclear irradiation. The acid chlorides (Examples 12, 13 and 19) can be reacted with 6-aminopenicillanic acid to give new penicillins. The amides and substituted amides are members of a known pharmaceutical class.

We claim:

1. A compound having the following formula:

pentafluorophenyl-R—COOH wherein R is an alkylene group containing 1 to 2 carbon atoms.
2. 2,3,4,5,6-pentafluorophenylacetic acid.
3. 2,3,4,5,6-pentafluorophenylpropionic acid.

References Cited by the Examiner

UNITED STATES PATENTS

| | | | |
|---|---|---|---|
| 2,977,212 | 3/1961 | Tischler | 71—2.6 |
| 3,012,072 | 12/1961 | Hazeldine 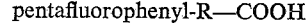 | 260—514 |

OTHER REFERENCES

Nield et al.: J. Chem. Soc. (London), vol. 1, pp. 166–171, 1959.

LORRAINE A. WEINBERGER, *Primary Examiner.*

T. L. GALLOWAY, *Assistant Examiner.*